United States Patent [19]

Kautzer et al.

[11] Patent Number: 4,742,424
[45] Date of Patent: May 3, 1988

[54] POWER STATUS MONITOR FOR ELECTRONIC SYSTEM

[75] Inventors: Jeffrey A. Kautzer; David C. Yates, both of Waukesha; Gerd Mewitz, New Berlin; Edward D. Nonnweiler, Milwaukee, all of Wis.

[73] Assignee: General Electric Company

[21] Appl. No.: 43,646

[22] Filed: Apr. 28, 1987

[51] Int. Cl.[4] .............................................. H02H 3/50
[52] U.S. Cl. ........................................ 361/78; 361/92; 307/129; 307/130
[58] Field of Search ................. 361/78, 85, 86, 92; 307/64, 66, 129, 130; 365/227, 228; 340/658, 663

[56] References Cited

U.S. PATENT DOCUMENTS

| | | | |
|---|---|---|---|
| 4,031,463 | 6/1971 | Norberg | 361/92 X |
| 4,443,709 | 4/1984 | Genuit et al. | 307/129 X |
| 4,510,549 | 4/1985 | Tedesco | 361/92 X |
| 4,540,892 | 9/1985 | Carualho | 307/130 |
| 4,558,389 | 10/1985 | Black, Jr. et al. | 361/78 X |
| 4,617,472 | 10/1986 | Slavik | 307/130 X |
| 4,685,023 | 8/1987 | Heaston | 361/92 X |

Primary Examiner—A. D. Pellinen
Assistant Examiner—Derek Jennings
Attorney, Agent, or Firm—Thomas R. Morrison

[57] ABSTRACT

A power status monitor for an electronic system includes a charge/discharge model of the system power supply. The charge/discharge model contains an estimate of the amount of time during which energy-storage devices in a system DC power supply are capable of maintaining system operation following loss of AC power. The power status monitor monitors the frequency and an amplitude of the voltage of the AC power source for signs indicating imminent failure of the AC power source. In the event that such signs are detected, the estimate in the charge/discharge model is decremented at a rate corresponding to the rate at which charge is consumed. A trip value, applied to the charge/discharge model, determines the time at which a signal is generated enabling an orderly shutdown of the system load. If acceptable AC power is resumed before the trip value is reached, the charge/discharge model increases its estimate of the time available at a rate corresponding to the charge accumulation in the DC power supply.

10 Claims, 6 Drawing Sheets

POWER STATUS MONITOR FOR ELECTRONIC SYSTEM

BACKGROUND OF THE INVENTION

The present invention relates to electronic devices and, more particularly, to electronic devices for monitoring the condition of an AC source and, in the event of unsatisfactory availability of AC power, for providing a signal indicating the unsatisfactory nature of the AC power. Either single-phase or multiple-phase power sources may be monitored.

As is well known, commercial AC power sources may experience periods during which the AC voltage slumps below its nominal value. In addition to periods of low voltage, commercial AC power sources may drop out, or fail to provide power, for periods ranging from one or two cycles of the AC power to extended periods of power outage.

Electronic circuits powered by AC electric power conventionally include a DC power supply for producing, from the available AC power, one or more sources of DC power usable by the electronic circuits. Such DC power supplies usually include filtering circuits for smoothing out the AC ripple which would otherwise be superimposed on the desired DC. Filtering circuits include energy-storage devices, usually including one or both of capacitors and inductors, capable of maintaining a satisfactory level of power for operation of the electronic circuits for a period of time following a power outage. Thus, rather than suddenly ceasing after an AC power outage, the output of a DC power supply decays at a rate dependent upon the capacity of the energy-storage devices contained therein and on the demands of the load. When AC power resumes, the need to supply energy to the energy-storage devices usually slows the rise in output of a DC power supply. The rate of decline and the rate of rise following loss and resumption of AC power, respectively, is usually unequal. That is, it may take more or less ti to recover a predetermined output of a DC power supply from a predetermined decay level than it does to reach the predetermined decay level from full output.

Many DC loads fed by a DC power supply may be severely affected by loss of DC power. For example, a load including a computer and peripherals may lose vital data from volatile storage devices if a DC failure occurs without steps being taken to avoid data loss. In addition, non-volatile storage devices may lose synchronism with clock and interrupt signals. Further, control-line outputs of the computer may become indeterminate causing corruptive system operation such as, for example, overwriting areas of random access memory. The recovery time from an unprotected power outage including, for example, reconstructing lost data and re-initializing gate and computer circuits may easily become unacceptable.

Some prior-art power-source monitoring devices detect the loss of AC power. Typically, such monitoring devices respond to the absence of a predetermined number of AC voltage cycles by producing a signal acted upon by the load to perform an orderly shutdown of the circuits using the energy stored in the energy-storage elements of the power supply. In this way, momentary dropouts in the AC supply of one or two cycles are ignored while permitting orderly shutdown of the system when the power outage persists for longer than the predetermined number of cycles.

A substantial motivation exists for keeping some electronic systems in operation, even in the presence of repeated, short-duration, AC power dropouts. The above prior-art device is limited to the detection of a single dropout of a predetermined duration. If power resumes before the predetermined duration is exceeded, and is followed closely by another dropout, the prior-art systems have no means for keeping track of the status of the energy storage in the DC power supply, except for direct measurement of the output voltage of the DC power supply.

Another indication of impending failure of AC power is found in a substantial decrease in the frequency of the AC power. The above prior-art power-monitoring devices do not take advantage of this indication.

OBJECTS AND SUMMARY OF THE INVENTION

It is an object of the invention to provide a power status monitor which overcomes the drawbacks of the prior art.

It is a further object of the invention to provide a power status monitor employing a model of the charge-discharge characteristics of a DC power supply for determining a time at which an AC power outage indicates a condition of unacceptable DC power triggering the beginning of a system shutdown.

It is a further object of the invention to provide a power status monitor including a device for monitoring a frequency of an AC input to indicate an impending AC power outage.

It is a further object of the invention to provide a power status monitor including a low-frequency detector and a model of the charge-discharge characteristics of a DC power supply to determine an optimum time to begin an orderly shutdown of a DC load connected to the DC power supply.

Briefly stated, the present invention provides a power status monitor for an electronic system including a charge/discharge model of the system power supply. The charge/discharge model contains an estimate of the amount of time during which energy-storage devices in a system DC power supply are capable of maintaining system operation following loss of AC power. The power status monitor monitors the frequency and peak voltage amplitude of the AC power source for signs indicating imminent failure of the AC power source. In the event that such signs are detected, the estimate in the charge/discharge model is decremented at a rate corresponding to the rate at which charge is consumed. A trip value, applied to the charge/discharge model, determines the time at which a signal is generated enabling an orderly shutdown of the system load. If acceptable AC power is resumed before the trip value is reached, the charge/discharge model increases its estimate of the time available at a rate corresponding to the charge accumulation in the DC power supply.

According to an embodiment of the invention, there is provided a power monitor for an electronic system comprising: means for sensing at least one condition of an AC power source for the electronic system, means for modelling a charge and a discharge of a DC power supply for the electronic system, the means for modelling containing a value related to a time during which the electronic system is capable of continuing operation following occurrence of the at least one condition, means in the means for modelling, responsive to an occurrence of the at least one condition, for modifying the value in a manner related to a charge or discharge of the DC power supply, whereby the value continues to be related to the time, and threshold means for producing a signal indicating unsatisfactory power when the value reaches a predetermined threshold.

According to a feature of the invention, there is provided a power monitor for an electronic system comprising: means for sensing at least first and second conditions of an AC power source for the electronic system, the at least first and second conditions including at least a peak voltage amplitude less than a first predetermined voltage threshold and a frequency less than a second predetermined frequency threshold, a charge/discharge model of a DC power supply for the electronic system, the charge/discharge model containing means for controlling a value related to a time during which the electronic system is capable of continuing operation following occurrence of the at least one condition, means charge/discharge model, responsive to an occurrence of either of the at least first and second conditions, for modifying the value in a manner related to a charge or discharge of the DC power supply, whereby the value continues to be related to the time, and threshold means for producing a signal indicating unsatisfactory power when the value reaches a predetermined threshold.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
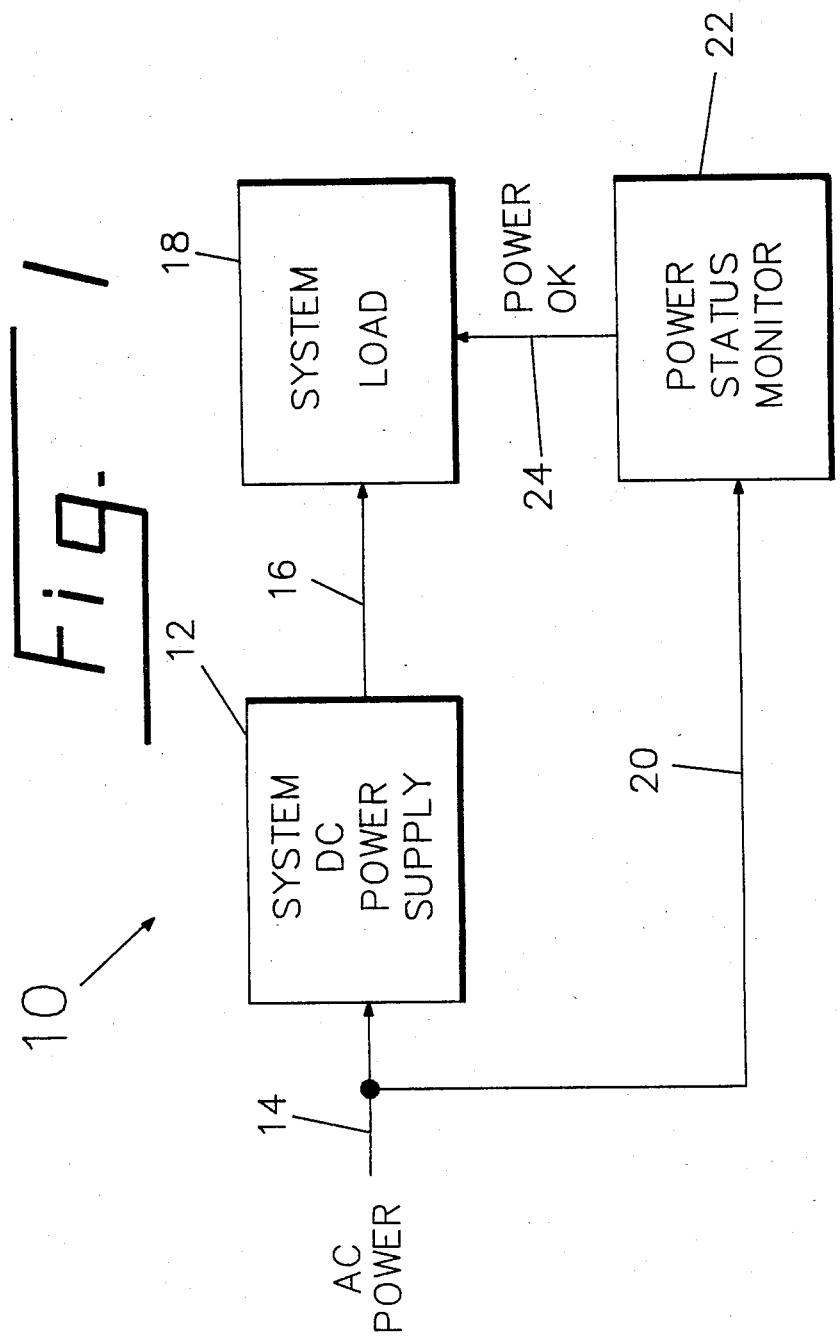
FIG. 1 a simplified block diagram of an electronic system including a power status monitor accordi an embodiment of the invention.

Referring to FIG. 1, there is shown, generally at 10, an electronic system including an embodiment of the invention. A system DC power supply 12 receives AC power from an AC power line 14 to produce one or more DC voltages for application on a line 16 to a system load 18. A line 20 applies a sample of the AC signal on AC power line 14 to a power status monitor 22. A power status signal is applied from power status monitor 22 on a power status line 24 to system load 18.

As long as the condition of the AC power on AC power line 14 remains within acceptable limits in terms of amplitude and frequency, and so long as any momentary AC dropouts endure for times short enough to be overcome by energy stored in system DC power supply 12, the power status signal on power status line 24 remains in a condition enabling operation of system load 18. In the event that a unacceptable power condition endures for a time long enough to endanger data or other conditions in system load 18, the power status signal on power status line 24 indicates this danger to system load 18 which is thereupon enabled to save data in non-volatile media and/or to perform other actions required for an orderly shutdown.

Shutdown of system load 18 is an event usually having undesired consequences such as, for example, lost time and function following the shutdown and often the inconvenience and time consumption of a substantial restart procedure. It is therefore desirable to avoid shutdown if avoidance can be done without the even more dire consequences of a disorderly shutdown for which no preparations are made. Accordingly, power status monitor 22 includes means for taking advantage of the energy storage inherent in filtering circuits in system DC power supply 12 to permit continued operation of system load 18 for a limited period following momentary corruption of the AC voltage on AC power line 14. The momentary corruption may include low voltage or complete loss of voltage for one or more cycles of the AC power input, or decay in the frequency of the AC voltage for a corresponding period. In the event that power returns to normal within the time that operation of system load 18 can be sustained on energy stored in system DC power supply 12, power status monitor 22 maintains the enable signal on power status line 24, whereby operation of system load 18 is continued.

Following a period during which system load 18 is operated on energy stored in system DC power supply 12, part of the energy normally stored in system DC power supply 12 is depleted. Consequently, if a second power corruption closely follows, the amount of time during which energy stored in system DC power supply 12 is capable of sustaining operation is reduced below the time available following a first power corruption. Power status monitor 22 includes means for accounting for the partially depleted condition of system DC power supply 12.

If a second power corruption fails to occur, after a period of time the energy-storage elements in system DC power supply 12 become fully recharged. Power status monitor 22 includes means for accounting for such recharge time and for intermediate values of recharge, whereby the maximum benefit can be gained from the stored energy without risking disorderly shutdown.

Figure 2:
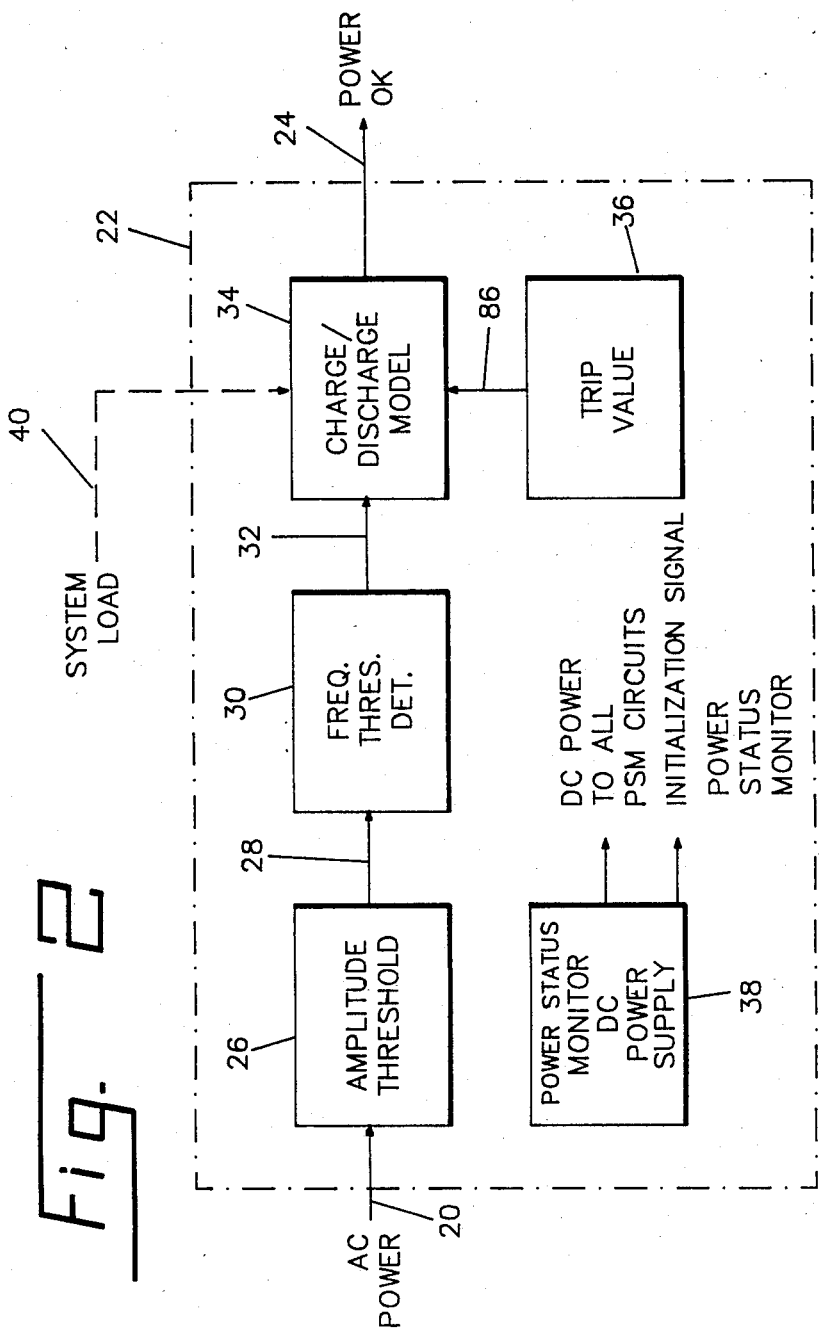
Fig 2 is a simplified block diagram of the power status monitor of FIG. 1.

Referring now to FIG. 2, power status monitor 22 includes an amplitude threshold circuit 26 receiving a sample of the AC voltage on line 20. The sample may include the AC voltage itself or, preferably, the AC voltage suitably transformed to a lower voltage appropriate for the electronic circuits in amplitude threshold circuit 26. In a preferred embodiment, the sample of AC voltage on line 20 is transformed from its full value to about 15.6 percent of its full value using a transformer (not shown) either external or internal to amplitude threshold circuit 26. Since transformers are notoriously well known in the art, such a device need not be shown.

Amplitude threshold circuit 26 produces output pulses for application on a line 28 to a frequency threshold detector 30 only when the amplitude of the AC voltage on line 20 exceeds a predetermined value. When the amplitude of the AC voltage is less than the predetermined value, no pulses are transmitted to frequency threshold detector 30. At other times, amplitude threshold circuit 26 transmits fixed-width pulses at a frequency equal to twice the frequency of the AC power on line 20.

Frequency threshold detector 30 determines whether or not the frequency of the pulses it receives on line 28 exceeds a threshold frequency. In the event that a satisfactory frequency is detected, frequency threshold detector 30 applies an enable signal on a line 32 to indicate this condition to a charge/discharge model 34. If the frequency of the pulses fed to frequency threshold detector 30 is less than the threshold frequency, the signal on line 32 indicates the unsatisfactory condition to charge/discharge model 34. It will be evident to one skilled in the art that the absence of pulses produced by low-amplitude AC voltage is the equivalent of a frequency of zero. Accordingly, frequency threshold detector 30 responds to low-amplitude AC voltage in the same manner as it responds to an AC frequency less than the threshold frequency; that is, by indicating an unsatisfactory power condition to charge/discharge model 34.

Charge/discharge model 34 contains a model generally corresponding to the charge and discharge characteristics of system DC power supply 12 (FIG. 1), given the energy consumption of system load 18. That is, during normal operation, charge/discharge model 34 contains a value representing the amount of charge contained in system DC power supply 12 when both the frequency and amplitude of the AC voltage equal or exceed their threshold values. When the AC power is corrupted, the value stored in charge/discharge model 34 is reduced at a rate corresponding to the depletion of stored energy in system DC power supply 12. If normal power conditions resume before it is too late, the value stored in charge/discharge model 34 is increased at a rate corresponding to the accumulation of energy in system DC power supply 12.

A trip-value generator 36 contains a value representing a residue of stored energy in system DC power supply 12 required for an orderly shutdown of system load 18. The trip value is continuously compared with the current value in charge/discharge model 34. As long as the current value remains above the trip value, a power OK signal is applied on power status line 24 to system load 18, enabling normal operation to continue. Once the current value falls below the trip value, the signal on power status line 24 triggers the beginning of an orderly shutdown which may be completed before the energy stored in system DC power supply 12 falls too low to provide power to do so.

Power status monitor 22 contains its own power status monitor DC power supply 38 for supplying DC power to all circuits therein. Power status monitor DC power supply 38 contains energy-storage elements having a storage capacity in comparison with their load which exceeds that of system DC power supply 12. This permits power status monitor 22 to monitor the status of AC power even after such AC power is severely corrupted in amplitude and/or frequency.

It will be clear to one skilled in the art that the rates for depletion and accumulation of energy may be different in dependence on the magnitude of system load 18 and the internal resistances and energy-storage elements in system DC power supply 12. If the load is very light and the internal resistances of system DC power supply 12 are low, the accumulation rate may be greater than the depletion rate. In a more typical case, the depletion rate is substantially greater than the accumulation rate. If the load is substantially constant, a single value for each of accumulation rate and depletion rate may be satisfactory. If the load is variable, both accumulation rate and depletion rate may be affected. If the variation in system load must be accounted for, a signal related to actual energy consumption by system load 18 is applied on a line 40 to charge/discharge model 34. Line 40 is shown dashed to indicate its optional nature. Estimates of actual system load may be derived, for example, from sensing on-off conditions of intermittently operated system elements or, in the alternative, by a measurement of current provided by system DC power supply 12. For present purposes, it is considered sufficient to disclose a constant-load system having a fixed, predetermined ratio of charge accumulation rate to charge depletion rate. One skilled in the art, with the benefit of the present disclosure, would be fully enabled to modify the present embodiment to account for variable loads.

Figure 3:
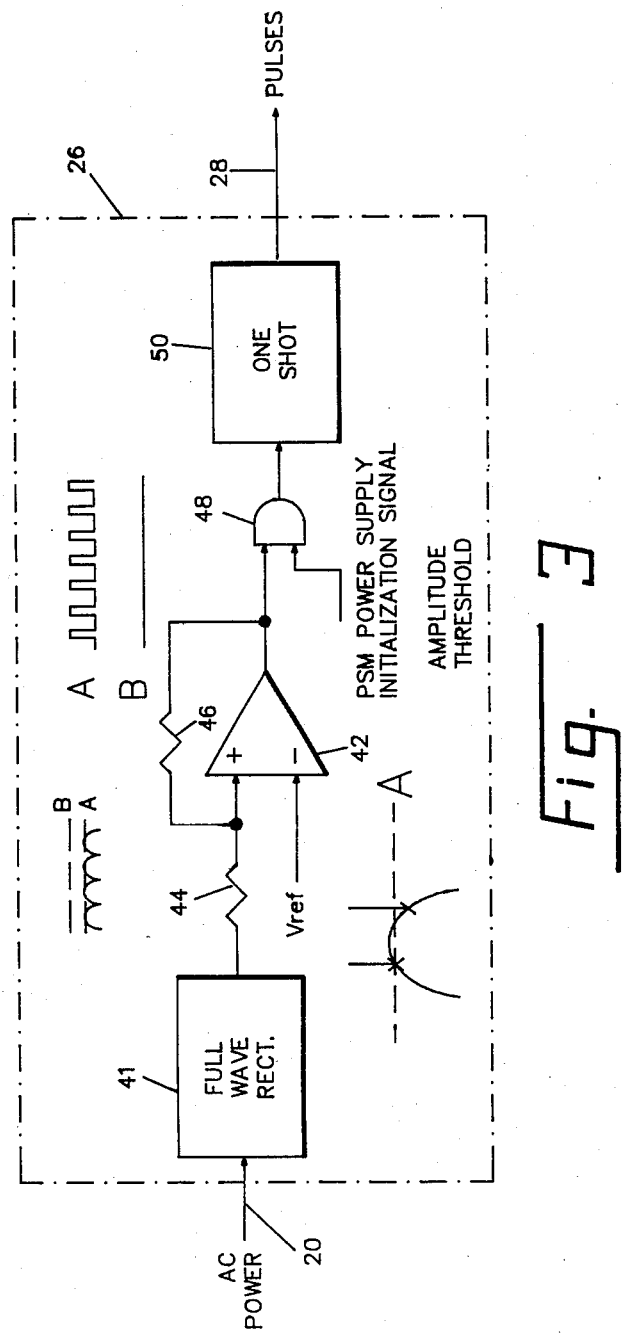
FIG. 3 is a simplified block and schematic diagram of the amplitude threshold circuit of FIG. 2.

Referring now to FIG. 3, amplitude threshold circuit 26 includes a full-wave rectifier 41 effective for producing a pulsating DC signal having a frequency equal to twice the frequency of the AC voltage sample fed to it on line 20. The pulsating DC signal is fed to a direct input of a comparator 42 through an input resistor 44. A reference voltage is fed to an inverting input of comparator 42. A feedback resistor 46 is connected between an output of comparator 42 and the direct input. The output of comparator 42 is connected to one input of an AND gate 48. A PSM DC power supply initialization signal is connected to a second input of AND gate 48. An output of AND gate 48 is connected to an input of a one-shot pulse generator 50. As indicated at A above the schematic, each time the pulsating DC signal exceeds the threshold voltage applied to the inverting input of comparator 42, indicated by a dashed line, an output pulse is applied by comparator 42 to AND gate 48. One-shot pulse generator 50 standardizes the width of the pulses outgoing on line 28 to, for example, about 5 microseconds. If the amplitude of the AC voltage is insufficient to exceed the threshold, as indicated at B above the schematic, the output of comparator 42 remains zero, and no output pulses are generated.

Feedback resistor 46 provides hysteresis in order to ensure at least a minimum output pulse width from comparator 42. As indicated below the schematic, the level of pulsating DC required to exceed the reference voltage and produce an output from comparator 42 is greater than that at which the output of comparator 42 ceases. This guarantees that, if the pulsating DC exceeds the threshold even for an instant, the output pulse from comparator 42 will endure for the required minimum pulse width.

Figure 4:
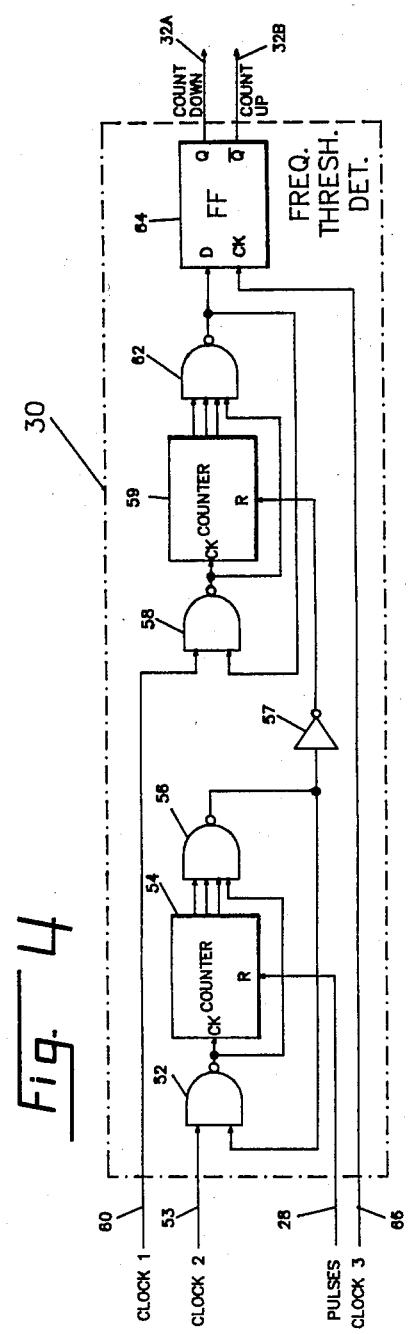
FIG. 4 is a logic diagram of the frequency threshold detector of FIG. 2.

Referring now to FIG. 4, frequency threshold detector 30 includes a NAND gate 52 receiving pulses on a clock2 line 53 from a clock (not shown) at a first input. An output of NAND gate 52 is applied to a clock input CK of a first counter 54. The pulses on line 28, produced in the manner just described, are applied to a reset input R of first counter 54. Selected outputs of first counter 54, along with the output of NAND gate 52, are applied to inputs of a NAND gate 56. The output of NAND gate 56 is connected back to a second input of NAND gate 52 and forward through an inverter 57 to a reset input R of a second counter 59. A clock1 line 60 applies a clock signal to an input of a NAND gate 58 whose output is connected to a clock input CK of second counter 59. The output of NAND gate 58 is also applied to an input of a NAND gate 62. Selected outputs of second counter 59 are applied to the remaining inputs of NAND gate 62. The output of NAND gate 62 is connected back to an input of NAND gate 58 and forward to a data input D of a D-type flip flop 64. The high-frequency system clock3 signal on a line 66 is connected to a clock input CK of D-type flip flop 64.

When both amplitude and frequency of the applied AC voltage are within predetermined limits, the signal applied to the data input D of D-type flip flop 64 remains 0. Thus, an inverting output Qbar of D-type flip flop 64 remains 1. As will be further detailed hereinafter, this condition enables charge/discharge model 34 (FIG. 2) to increase its value representing a stored charge. Upon failure of either voltage or frequency to remain within predetermined limits, a 1 is applied to the data input D of D-type flip flop 64. Upon the occurrence of the next clock3 signal at the clock input CK of D-type flip flop 64, the inverting output Qbar thereof becomes 0 and the direct output Q becomes 1. This condition enables charge/discharge model 34 to decrement its value representing stored charge.

In operation, the capacities of first counter 54 and second counter 59 are selected, together with their clock frequencies, so that first counter 54 becomes filled well before second counter 59 can become filled. The time required to fill first counter 54 is longer than the normal rate at which pulses arrive on line 28. Thus, under normal conditions, first counter 54 is always reset before it completes its cycle to produce a 0 output from NAND gate 56. Accordingly, inverter 57 normally applies a constant 0 to the reset input R of second counter 59. This permits second counter 59 to count clock pulses until it enables all inputs of NAND gate 62. A resulting 0 at the output of NAND gate 62, fed back to the input of NAND gate 58 blocks the application of further clock pulses to the clock input CK of second counter 59. Upon the occurrence of the next clock3 signal, the 0 at the data input D of D-type flip flop 64 produces a 0 at the direct output Q and a 1 at the inverted output Qbar of D-type flip flop 64. This power-OK condition enables charge/discharge model 34 (FIG. 2) to increase a value representing stored charge.

As operation continues with normal power conditions, second counter 59 remains locked in the described condition and first counter 54 counts part way toward its filled condition but is always reset before reaching a condition enabling all inputs of NAND gate 56.

If first counter 54 attains the value required to enable all of the inputs of NAND gate 56 before a pulse arrives at the reset input R of first counter 54, the output of NAND gate 56 changes from 1 to 0. This signal, fed back to the input of NAND gate 52, inhibits NAND gate 52, thus halting further counting in first counter 54, and thus stopping further change produced by the arrival of pulses at the clock input CK. The 0 at the output of NAND gate 56, inverted in inverter 57, applies a 1 to the reset input R of second counter 59. This resets second counter 59 and holds it in the reset condition as long as the 1 remains at the reset input R. The resulting 1 at the data input of D-type flip flop 64 is latched in at the occurrence of the next clock3 signal on clock3 line 66, whereby charge/discharge model 34 (FIG. 2) is enabled to begin decrementing a value representing stored charge.

As previously noted, if the peak voltage amplitude of the AC voltage is too low, no pulses are applied to line 28, thus the described condition with a 1 at the output of inverter 57 is maintained. If peak voltage amplitude of the AC voltage exceeds the threshold, but the frequency is lower than the value established by the filling time of first counter 54, at some time after first counter 54 fills and resets second counter 59, a pulse on line 28 resets first counter 54. This removes the reset signal from the reset input R of second counter 59, and removes the inhibiting 0 from the input of NAND gate 52. Accordingly, both first counter 54 and second counter 59 begin counting their respective clock inputs The capacities and clock frequencies of first counter 54 and second counter 59 are related such that, in the absence of a reset pulse on line 28, first counter 54 fills before second counter 59. As a consequence, when both counters begin counting at the same time, first counter 54 completes its cycle first and applies a reset signal through NAND gate 56 and inverter 57 to the reset input R of second counter 59 before second counter 59 reaches a full count. In this manner, the condition of D-type flip flop 64 remains unchanged and a continued indication of unsatisfactory power conditions is produced Although any suitable set of clock frequencies and capacities can be selected for frequency threshold detector 30, in one embodiment, the numbers and capacities are selected to permit first counter 54 to fill in about 10 milliseconds and to permit second counter 59 to fill in about 12 milliseconds. This filling time of first counter 54 provides a frequency threshold of about 46.5 Hz. The filling time of second counter 59 is selected to be slightly longer than that of first counter 54 to permit operation in the manner described. If a different frequency threshold is desired, one skilled in the art would be fully enabled to select suitable clock frequencies and capacities given the foregoing teaching.

Figure 5:
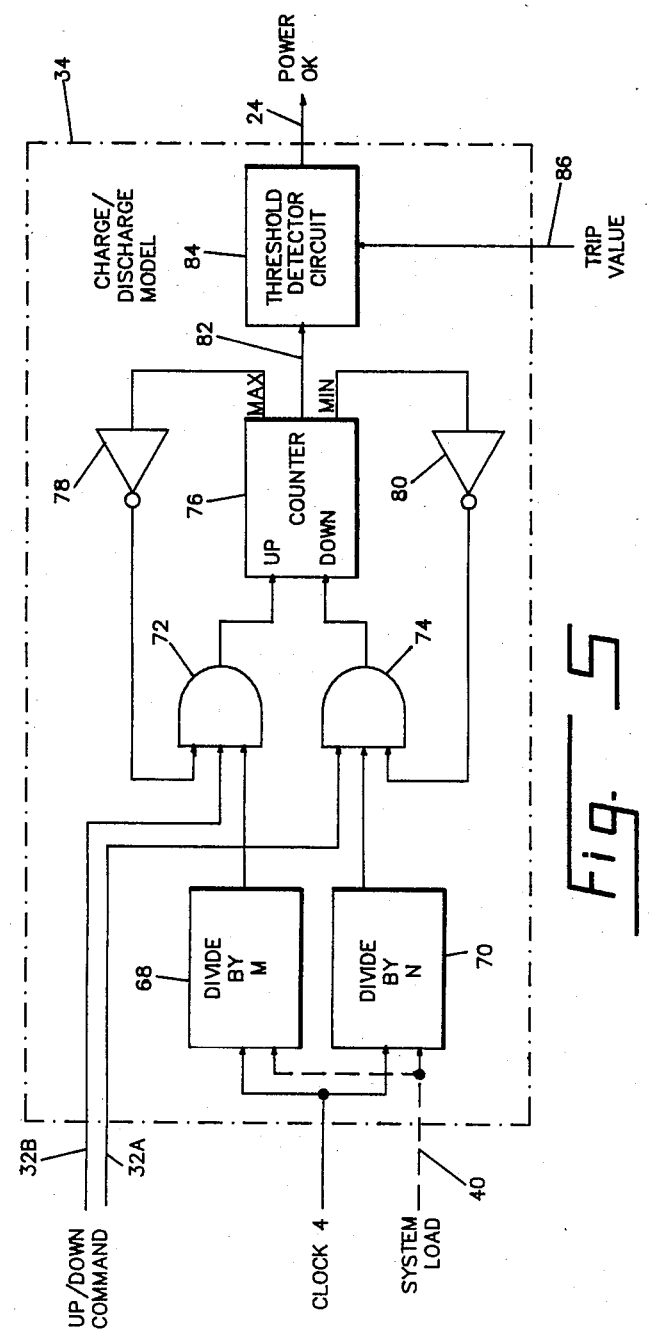
FIG. 5 diagram of the charge/dischare model of FIG. 2.

Referring now to FIG. 5, charge/discharge model 34 receives a clock signal at inputs of a divide-by-M counter 68 and a divide-by-N counter 70. Outputs of divide-by-M counter 68 and divide-by-N counter 70 are applied to inputs of AND gates 72 and 74, respectively. The up-enable signal from frequency threshold detector 30 (FIG. 4) is applied on line 32B to a second input of AND gate 72. The down-enable signal from frequency threshold detector 30 is applied on line 32A to a second input of AND gate 74. The output of AND gate 72 is applied to an UP input of an UP/DOWN counter 76. The output of AND gate 74 is applied to a DOWN input of UP/DOWN counter 76. One output of UP/DOWN counter 76 is connected back through an inverter 78 to the third input of AND gate 72. The output selected for application to inverter 78 is one which becomes 1 when the number accumulated in UP/DOWN counter 76 reaches its maximum value. Thus, when the maximum value is attained, counting in UP/DOWN counter 76 is halted by the inhibit signal applied by inverter 78 to an input of AND gate 72. Another output of UP/DOWN counter 76 is connected back through an inverter 80 to a third input of AND gate 74. The output selected for application to inverter 80 is one which becomes 1 when the number in UP/DOWN counter 76 is decremented to its minimum value. This signal halts down-counting in UP/DOWN counter 76.

Selected ones of the values stored in UP/DOWN counter 76 are applied on a line 82 to a threshold detector circuit 84. A trip value is applied on a line 86 to threshold detector circuit 84. The trip value establishes the minimum content of UP/DOWN counter 76 at which the signal on power status line 24 changes to indicate a power fault serious enough to warrant the beginning of an orderly shutdown.

The capacity of UP/DOWN counter 76 is selected, in conjunction with the frequencies applied to its UP and DOWN inputs, such that its content is related to the charge remaining in system DC power supply 12 (FIG. 1) and available for maintaining operation of system load 18 during a period of corrupted AC power. If, for example, fully charged energy storage devices are capable of sustaining operation of system load 18 for 100 milliseconds before an orderly shutdown must be initiated, then the frequency of the clock signal, the integer N in divide-by-N counter 70, and the capacity of UP/DOWN counter 76 are selected such that decrementing the count in UP/DOWN counter 76 from its maximum value to the trip value on line 86 takes 100 milliseconds.

The integer M in divide-by-M counter 68 is selected such that the rate of accumulation of the count in UP/DOWN counter 76 generally corresponds to the increase in available charge in system DC power supply 12. If the rate of charge accumulation with normal power is, for example, one-fourth the rate of charge consumption with power lost, then the values of integers M and N are preferably in a like ratio. In the prior example, wherein the count is decremented from full to the trip level in 100 milliseconds, the integer M may be selected to slow the rate at which UP/DOWN counter 76 counts up from the trip level to the full condition to a value requiring 400 milliseconds to complete. In this example, if a power corruption endures, for example, about 50 milliseconds, the full capacity of UP/DOWN counter 76 requires 200 milliseconds for its attainment. During the decrementing and incrementing of UP/DOWN counter 76, the value contained therein always provides a model of the available charge or, equivalently, the amount of time remaining during which the system may be sustained on the stored charge before a shutdown must be initiated.

Threshold detector circuit 84 may be of any convenient type. In the preferred embodiment, threshold detector circuit 84 is a logic circuit consisting of, for example, an array of logic gates (not shown) receiving the selected outputs of UP/DOWN counter 76 at some inputs thereof. Trip-value generator 36 (FIG. 2) may be a switch array producing a pattern of output voltages connected on line 86 to threshold detector circuit 84 (FIG. 5) and effective for producing a signal indicating AC power corruption dependent upon the settings of such switches. Since a logic circuit and switch array capable of accomplishing the functions of threshold detector circuit 84 and trip-value generator 36 are conventional, further description thereof is considered redundant and is therefore omitted.

The signal representing system load optionally may be applied on line 40 to one or both of divide-by-M counter 68 and divide-by-N counter 70. This signal changes the integers M and/or N to change the rate of counting up and down in UP/DOWN counter 76 according to the changes in charge consumption and accumulation in system DC power supply 12 under different load conditions. Internal to divide-by-M counter 68 and divide-by-N counter 70, the signal on line 40 may enable or inhibit one or more logic elements for changing the division ratios therein. Other techniques for providing dynamic response to changing load would occur to one skilled in the art.

Figure 6:
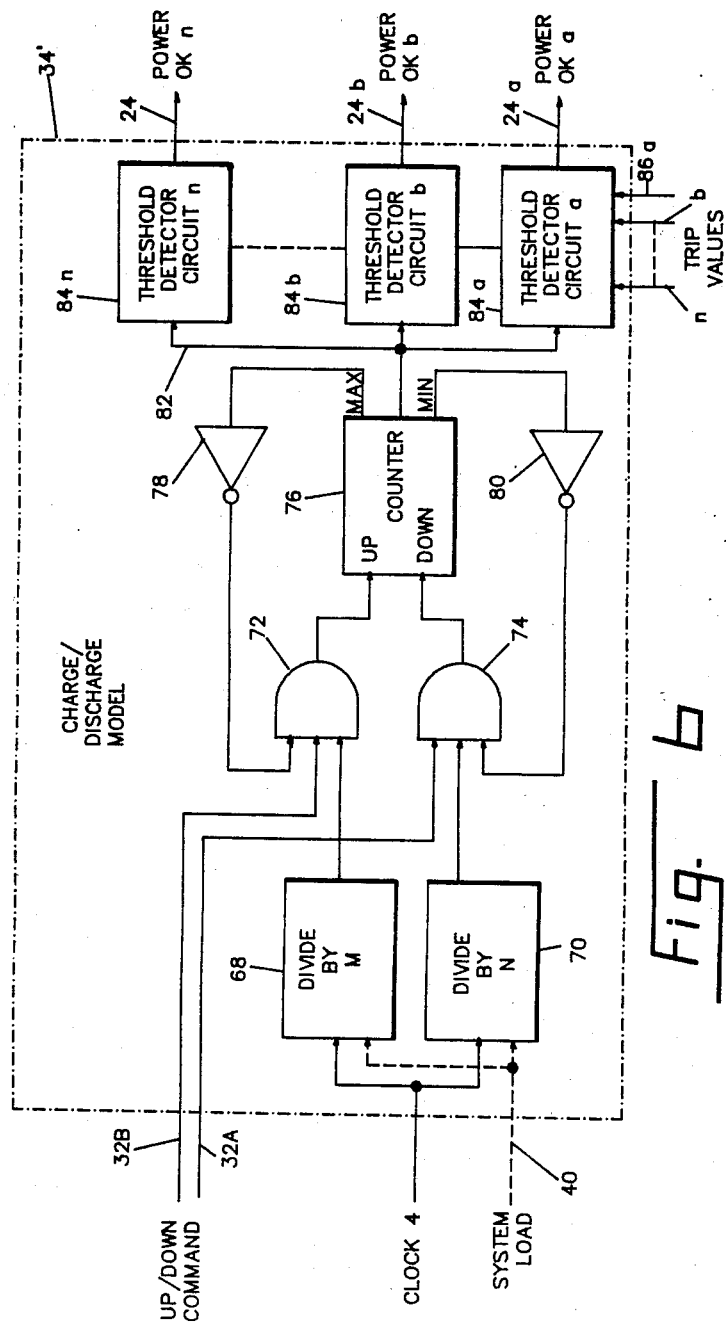
FIG. 6 a logic diagram of an embodiment of the charge/discharge model having a plurality of trip levels for detecting different levels of severity of power outage.

Referring now to FIG. 6, a charge/discharge model 34' provides for the detection of a plurality of levels of severity of power failure. Threshold detector circuits 84a, 84b to 84n each receives the output of UP/DOWN counter 76 on line 82. A plurality of threshold values are applied to threshold detector circuits 84a, 84b to 84n on lines 86a, 86b to 86n. A corresponding plurality of power OK signals are thus produced on power status lines 24a, 24b - to 24n, each conveying unique information about the severity of a power failure. Such graduated power-failure indications may be useful in providing means for managing an orderly shutdown, as well as for delaying, until the last possible moment, the shutdown of elements which are most troublesome to restart. At one level of power failure, high-current-consumption circuits may be shut down to permit sustaining more critical elements such as, for example, random access memory, for a longer period than is possible without shedding part of the load.

In a similar manner, a power supply systemd supplying power to more than one electronic system may duplicate the charge/discharge model of FIGS. 5 or 6 for each set of electronic system loads. This provides the flexibility for programming each model to reflect the unique characteristics of the load with which it is associated. Each charge/discharge model in such a federated system may contain unique threshold detector circuits and may deliver one or more power OK signals depending on the load with which it is associated.

One skilled in the art with the present disclosure for guidance would recognize that an analog embodiment could be produced without departing from the scope of the invention. For example, analog timers could be substituted for counters thereby accomplishing the functions whose digital embodiments are disclosed in the preceding. In addition, although the foregoing disclosure employs peak amplitude of the AC voltage for detection, an embodiment of the invention employing RMS voltage amplitude should be equally considered withing the coverage of the claims. Similarly, alternative frequency detection devices may be substituted for those in the illustrative embodiment. For example, a phase-locked loop may be used for frequency detection.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A power monitor for an electronic system comprising:
   means for sensing at least one condition of an AC power source for said electronic system;
   means for modelling a charge and a discharge of a DC power supply for said electronic system;
   said means for modelling containing a value related to a time during which said electronic system is capable of continuing operation following an occurrence of said at least one condition;
   means in said means for modelling, responsive to an occurrence of said at least one condition, for modifying said value in a manner related to a charge or discharge of said DC power supply, whereby said value continues to be related to said time; and
   threshold means for producing a signal indicating unsatisfactory power when said value reaches a predetermined threshold.

2. A power monitor according to claim 1 wherein said at least one condition includes at least one of a voltage amplitude and a frequency of said AC power source.

3. A power monitor according to claim 1 wherein said at least one condition includes a voltage amplitude and a frequency of said AC power source.

4. A power monitor according to claim 1 wherein said means for sensing includes:
- an amplitude threshold;
- said amplitude threshold including means for producing a pulse each time a voltage of said AC power exceeds said predetermined threshold;
- a frequency threshold detector receiving said pulses;
- said frequency threshold detector including means for producing said signal having a first condition in response to a frequency of said pulses exceeding said predetermined threshold value and a second condition in response to said frequency being less than said predetermined threshold value; and
- said signal being effective for controlling said means for modelling.

5. A power monitor according to claim 4, wherein said frequency threshold detector includes:
- a counter having a first capacity;
- said counter being responsive to a clock signal for counting toward a predetermined final value;
- means for producing a control signal for controlling said means for modelling to modify said value when said counter attains said predetermined final value;
- means responsive to said pulses for resetting said counter; and
- said clock signal and said capacity being related in a manner, whereby said counter is reset by said pulses before attaining said predetermined final value whenever said frequency exceeds said predetermined threshold value.

6. A power monitor according to claim 5, wherein said frequency threshold detector further includes:
- a second counter;
- said second counter being responsive to a second clock signal for counting toward a second predetermined final value;
- said second clock signal and said second predetermined final value being related to require substantially longer for said second counter to reach said second predetermined final value than it does for said first counter to reach its predetermined final value;
- means responsive to said frequency being less than said predetermined threshold value for permitting both the first-mentioned and said second counter to begin counting toward their respective predetermined final values;
- means for resetting said second counter when said first-mentioned counter reaches its predetermined final value, whereby said second counter is prevented from reaching its second predetermined final value; and
- said signal being responsive to said second counter containing other than said second predetermined final value for reducing said predetermined threshold value at a first predetermined rate, and responsive to said second counter containing said second predetermined final value for increasing said predetermined threshold value at a second predetermined rate.

7. A power monitor according to claim 4, wherein said frequency threshold detector includes:
- a timer having a first capacity;
- said timer being responsive to a gate signal for moving toward a predetermined final value;
- means for producing a control signal for controlling said means for modelling to modify said value when said timer attains said predetermined final value;
- means responsive to said pulses for resetting said timer; and
- said gate signal and said capacity being related in a manner, whereby said timer is reset by said pulses before attaining said predetermined final value whenever said frequency exceeds said predetermined threshold value.

8. A power monitor according to claim 7, wherein said frequency threshold detector further includes:
- a second timer;
- said second timer being responsive to a second gate signal for moving toward a second predetermined final value;
- said second gate signal and said second predetermined final value being related to require substantially longer for said second timer to reach said second predetermined final value than it does for said first timer to reach its predetermined final value;
- means responsive to said frequency being less than said predetermined threshold value for permitting both the first-mentioned and said second timer to begin moving toward their respective predetermined final values;
- means for resetting said second timer when said first-mentioned timer reaches its predetermined final value, whereby said second timer is prevented from reaching its second predetermined final value; and
- said signal being responsive to said second timer containing other than said second predetermined final value for reducing said predetermined threshold value at a first predetermined rate, and responsive to said second timer containing said second predetermined final value for increasing said predetermined threshold value at a second predetermined rate.

9. A power monitor for an electronic system comprising:
- means for sensing at least first and second condition of an AC power source for said electronic system;
- means for modelling a charge and a discharge of a DC power supply for said electronic system;
- said means for modelling containing at least first and second values related to first and second times during which at least first and second functions of said electronic system are capable of continuing operation following an occurrence of said at least first and second conditions, respectively;
- means in said means for modelling, responsive to an occurrence of said at least first and second conditions, for modifying said value in a manner related to a charge or discharge of said DC power supply, whereby said value continues to be related to said first and second times; and
- at least first and second threshold means for producing at least first and second signals indicating first and second conditions of unsatisfactory power when said value reaches first and second predetermined thresholds respectively.

10. A power monitor for an electronic system comprising:
 means for sensing at least first and second conditions of an AC power source for said electronic system;
 said at least first and second conditions including at least a voltage amplitude less than a first predetermined voltage threshold and a frequency less than a second predetermined frequency threshold;
 a charge/discharge model of a DC power supply for said electronic system;
 said charge/discharge model containing means for controlling a value related to a time during which said electronic system is capable of continuing operation following an occurrence of at least one of said first and second conditions;
 means in said charge/discharge model, responsive to an occurrence of either of said at least first and second conditions, for modifying said value in a manner related to a charge or a discharge of said DC power supply, whereby said value continues to be related to said time; and
 threshold means for producing a signal indicating unsatisfactory power when said value reaches a predetermined threshold.

* * * * *